Dec. 3, 1940.                C. M. MILLER                2,223,525
                         FILM MAGAZINE LIGHT TRAP
                          Filed May 9, 1938          2 Sheets-Sheet 1
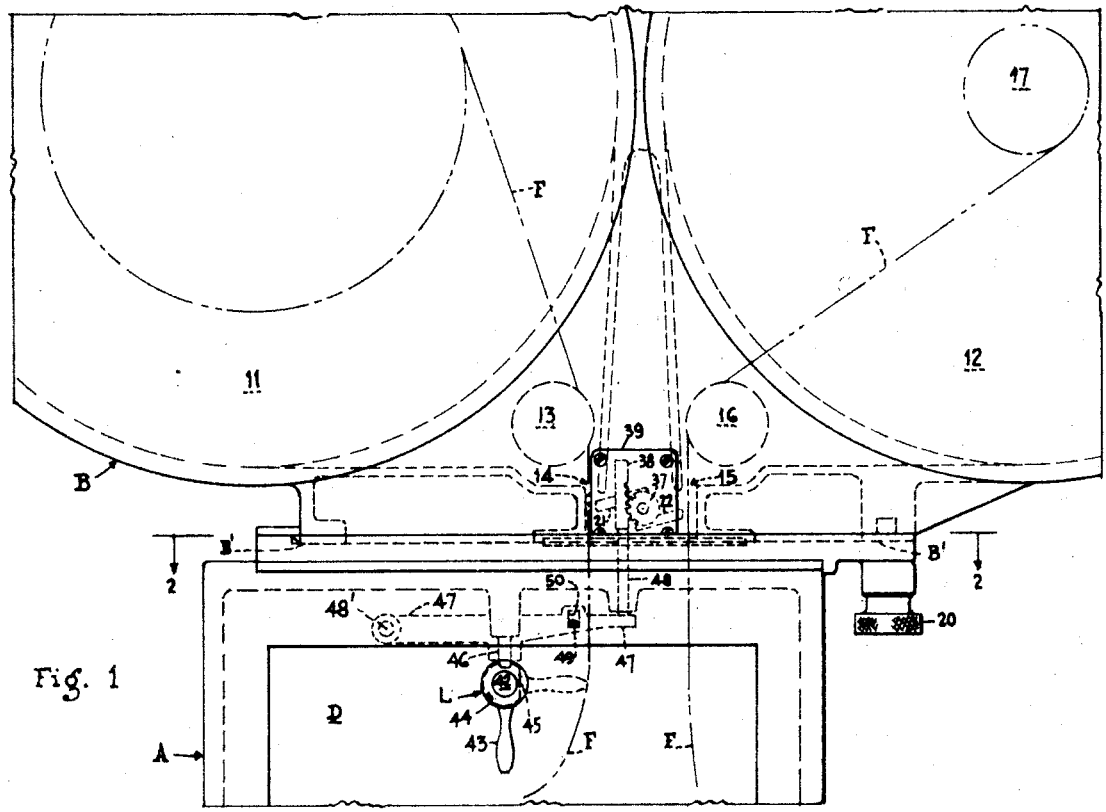
Fig. 1
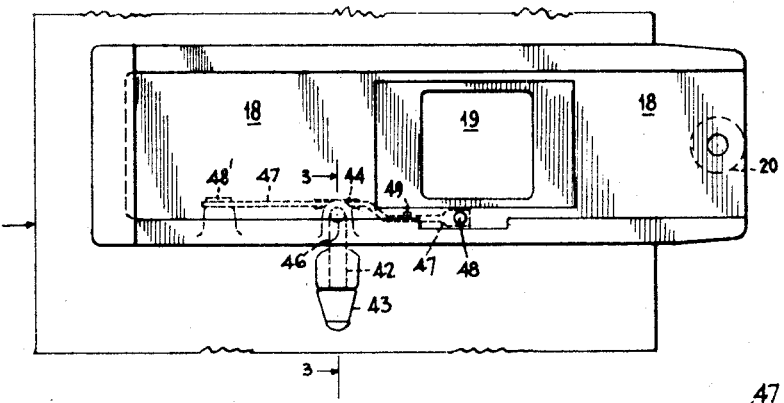
Fig. 2.
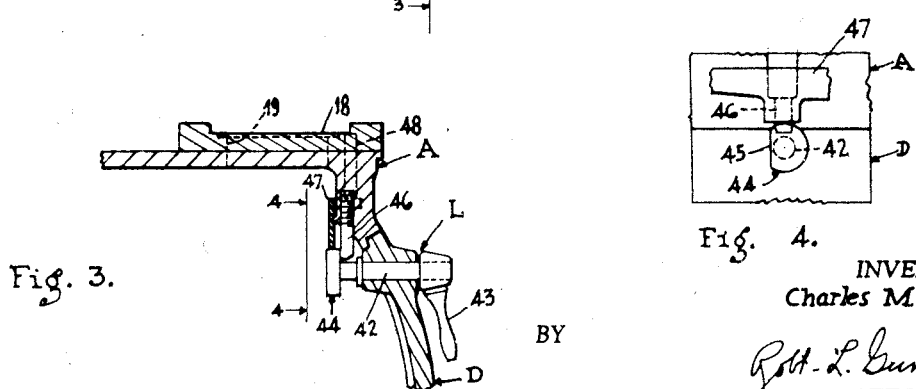
Fig. 3.
Fig. 4.
INVENTOR.
Charles M. Miller.
BY
ATTORNEY.

Dec. 3, 1940.   C. M. MILLER   2,223,525
FILM MAGAZINE LIGHT TRAP
Filed May 9, 1938   2 Sheets-Sheet 2

INVENTOR.
Charles M. Miller
BY
Robt. L. Gunn
ATTORNEY

Patented Dec. 3, 1940

2,223,525

UNITED STATES PATENT OFFICE 2,223,525

FILM MAGAZINE LIGHT TRAP

Charles Melvin Miller, Los Angeles, Calif., assignor to Twentieth Century-Fox Film Corporation, Los Angeles, Calif., a corporation of New York Application May 9, 1938, Serial No. 206,744

7 Claims. (Cl. 88—17)

This invention relates to film magazines such as are used on motion picture cameras and deals with a light trap for automatically opening and closing the film apertures in the magazine.

The conventional film magazine for motion picture cameras ordinarily comprises two compartments. One of the compartments, the feeding compartment, is used for housing a roll of raw film stock and the other compartment, the take-up compartment, is used for housing the film after it has been exposed. The film runs continuously from one compartment to the other and in so doing must pass out of the feeding compartment through an aperture and after forming a loop for threading in the camera passes back into the take-up compartment through another aperture. In practice it is necessary to keep these two apertures closed when the magazine is not on the camera to prevent light leaking into the magazine and fogging the film and even when the magazine is mounted on the camera it is necessary to have a means that closes the apertures into the two compartments when the camera door is open. It is the primary object of my invention to provide a light trap in a film magazine, comprising vanes or doors, that may be operated to open and close the film apertures so that the film flows freely through the apertures and at the same time the magazine may be used with an unobstructed opening into the camera case. To accomplish this, I provide an improved type of vane for pressing the film against the wall of the film aperture to shut off all light from entering the magazine compartments and also provide an improved means for withdrawing the vanes when the camera door is closed, said means being so arranged that it operates from one side of the magazine and leaves an unobstructed opening into the camera case for the film loop.

Another object of the invention is to provide a light trap for film magazines which is not operated by the closing of the door but is operated by the means that locks the door in a closed position. A further object of the invention is to provide a means of the character described that may be installed or incorporated in any type of motion picture camera, either large or small.

Other objects and advantages, such as the simplicity of construction, the durability and the effectiveness of the device, will become apparent as the description proceeds in conjunction with the drawings, in which:

Figure 1 is a fragmentary view showing a side elevation of a camera with a magazine in place.

Figure 2 is a top plan view of the camera case, taken on line 2—2 of Figure 1, showing the top of the case for mounting the magazine and the opening into the case for the film loop.

Figure 3 is a section, taken on line 3—3 of Figure 2, showing the door locking means and part of the means for operating the light trap.

Figure 4 is a fragmentary view taken on line 4—4 of Figure 3, showing the cam and lever arrangement for operating the light trap.

Figure 5:
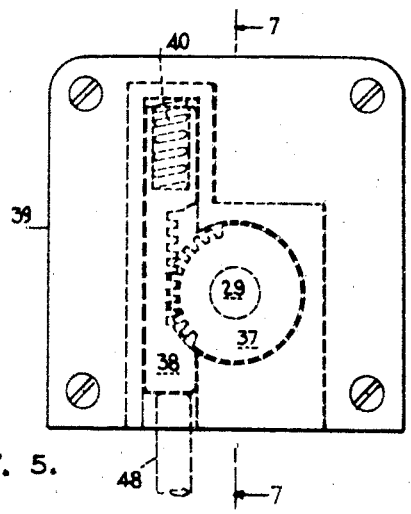
Figure 5 is an enlarged view showing in detail the means for operating the light trap.

Briefly stated, the invention comprises a pair of vanes adapted to be slid into and out of position over the magazine film apertures in such a manner that the apertures are entirely closed and the film is pressed up against one wall of the aperture. The means for doing this comprises a rack and pinion arrangement at one side of the magazine, which is adapted to be operated by a lever on the camera case, said lever in turn being actuated by the turning of the locking handle on the camera door. As before stated, it is one of the objects of this invention to provide a light trap in film magazines, wherein the trap may be opened to allow the film to pass freely therethrough, and at the same time an unobstructed opening into the top of the camera case for the film loop may be used.

Referring to the drawings and more specifically to Figure 1, it will be seen that I have shown a fragmentary view of a motion picture camera comprising, generally speaking, a camera case designated A and a magazine generally designated B. The magazine B is provided with two compartments 11 and 12, which may be termed the feeding compartment and the take-up compartment respectively. The film F from the feeding compartment 11 passes over a roller 13 and through a film aperture 14 and after forming a loop for threading in the camera passes back into the compartment 12 through another aperture 15 in the magazine and over another roller 16, whereupon it is wound upon a spool 17 in the take-up compartment. Over the apertures 14 and 15 I have incorporated my invention, which will be more fully described hereinafter. The magazine B is arranged to be mounted upon the camera case A in any suitable manner and in this instance is shown as being mounted on the case on a base corresponding to line B' of Figure 1.

In Figure 2 I have shown a fragmentary view of the camera case with the magazine removed. The case is shown with a flat surface 18 for receiving the magazine base B', said flat surface being provided with an opening 19 which is disposed so as to come directly beneath and extend under the apertures 14 and 15 of the magazine to allow the film loop to fall freely into the camera case. Means are ordinarily provided for locking the magazine on the camera case and are shown here as a thumb nut 20.

Figure 6:
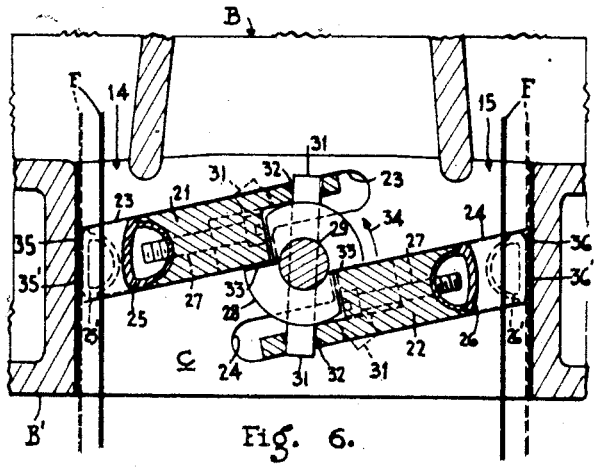
Figure 6 is a view, taken on line 6—6 of Figure 7, showing the vanes or doors that close the apertures and the means for moving the vanes.
Figure 7:
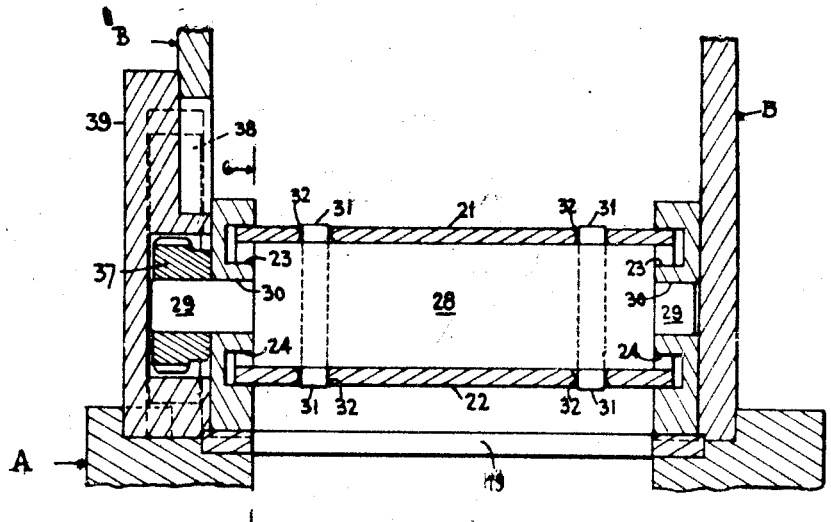
Figure 7 is a section through the vanes, taken on line 7—7 of Figure 5, showing the manner of installing the same.

The means for closing the apertures 14 and 15 is best illustrated in Figures 5, 6 and 7. Referring first to Figure 6, it will be observed that the aperture 14 is adapted to be closed by a vane or door 21 and the aperture 15 is adapted to be closed by a similar vane or door 22. It is to be understood that the apertures 14 and 15 are in the nature of slots of sufficient dimension to freely pass a motion picture film and terminate in a chamber C. The vanes 21 and 22 are mounted in the chamber C adjacent the ends of the apertures 14 and 15 and are arranged to slide in recesses 23 and 24 respectively formed in the end walls of the chamber C, the recesses being for the purpose of insuring a light tight seal and forming a guide. The outer ends of the vanes may be equipped with suitable pads 25 and 26, such as felt or velvet, for forming a light tight seal when pressed against the film. These pads may be held in place by any suitable means, such as bolts 27. The vanes 21 and 22 are adapted to be reciprocated in the recesses 23 and 24 respectively and for this purpose I provide a roller 28, mounted on a shaft 29, said shaft in turn being rotatably mounted in the walls of the chamber C as illustrated in Figure 7 and designated 30. The roller 28 carries a plurality of pins 31 which extend through openings 32 in the vanes 21 and 22. The roller 28 may be cut away longitudinally as shown and designated 33 to allow the vanes 21 and 22 full movement for opening and closing the apertures. In order to close the apertures by the vanes 21 and 22, the roller 28 is rotated in the direction of the arrow 34 and the vanes and roller assume the positions shown by dotted lines in Figure 6. In this position it will be observed that the film F is pressed against the walls 35 and 36 of the chamber C, which may be covered with suitable material 35' and 36', such as felt or velvet, and is held against the walls by the pads 25 and 26, thus forming a perfect light seal. The means for rotating the roller 28 comprises a gear 37 mounted upon the shaft 29, said gear in turn being adapted to be engaged by a rack bar 38 suitably mounted in a plate 39, which in turn is mounted on the side of the magazine at one end of the chamber C. The rack bar 38 is pressed downwardly by a spring 40, which tends to normally close the apertures 14 and 15 until an upward force is exerted on the rack bar 38.

The means for applying force to the rack bar 38 will now be described. As before stated, it is one of the objects of this invention to open the film apertures into the magazine compartments only when the camera door is closed and the lock is turned. Accordingly, the invention provides means in the camera case for moving the rack bar 38. The means for this purpose is illustrated in Figures 1 to 4. Here it will be observed that the camera case A is provided with the flat surface 18, upon which the magazine B is adapted to be mounted and, as previously described, the flat surface 18 is formed with an unobstructed opening 19, through which the film loop drops freely into the camera case. In order to accomplish the object of this invention, it is necessary to bring the means for opening and closing the aperture doors to one side of the opening 19. The camera case A will also be seen to have a door D of the ordinary construction which opens the side of the camera for threading the film through the intermittent movement. The door is equipped with a locking device generally designated L. This invention embodies means for translating movement from the locking means L to the rack bar 38 to open the light trap in the magazine. In Figure 3 I have shown a detail of the parts of the locking device L. In this view I have shown the device L as comprising a small shaft 42 rotatably mounted in the upper edge of the door D, said shaft having a handle 43 on the outer end thereof and a disc 44 on the inner end. The disc 44 serves the double purpose of locking the door and of opening the light traps. As will be seen in Figure 4, the disc 44 has a flat side 45, which in effect forms a cam. The purpose of this flat side is to pass a pin 46 mounted in the camera case A so that it may be caught behind the disc 44 when the handle 43 is turned. The other purpose of the cam-shaped disc 44 is to move a lever 47 pivotably mounted on the camera case as shown at 48'. The free end of the lever 47 engages a pin 48 slidably mounted in the camera case. The pin 48 is arranged to come directly beneath the rack bar 38 when the magazine is mounted in operative position on the camera case. A small pin 49 working in a slot 50 in the arm 47 may be installed on the camera case to hold the arm 47 from dropping down when the camera door is opened. The whole assembly for moving the rack bar 38 will be observed to be mounted on the camera case and to one side of the opening 19 which permits an unobstructed opening into the case and allows the film from the magazine to drop freely through the opening for threading the camera.

In operation the magazine is loaded in the usual manner with the customary film loop extending between the apertures 14 and 15, the apertures 14 and 15 being closed by the doors 21 and 22 which are normally closed under the influence of the spring 40 acting on the rack bar 38. The magazine is then mounted upon the camera case A in the usual manner and after threading the film through the film movement mechanism the door D is shut and locked by turning the handle 43 from the dotted position to the full line position in Figure 1. In turning the handle 43, the cam-shaped disc 44 locks the door closed against the pin 46 and at the same time raises the lever 47 which pushes the pin 48 against the rack bar 38 and withdraws the vanes 21 and 22, thus allowing the film free passage through the apertures into and out of the camera. As long as the camera door is closed and locked, the vanes 21 and 22 remain withdrawn, but as soon as the handle 43 is turned to the dotted line position in Figure 1, for opening the camera door, the vanes 21 and 22 immediately close the apertures 14 and 15 before the camera door can be opened. The arrangement of the parts provides a structure that is durable and not easily damaged and has a distinct advantage, in that the apertures are positively closed before the camera door can be opened and are not opened until the camera door is fully closed. In addition, the mechanism for operating the light trap being to one side of the opening into the camera, an unobstructed opening may be used and the mounting of the magazine on the camera becomes a comparatively simple matter, inasmuch as the film loop is dropped directly into the camera.

I claim:

1. In a motion picture camera having a camera door with a lock thereon, a film magazine having compartments with film apertures into each of said compartments, light proof doors at each of said compartments and means for moving said doors to open and close said apertures by the operation of the lock on said camera door, said last mentioned means including a lever pivotably mounted on the case of said camera, and a cam on said lock adapted to swing said lever upon its pivot upon the operation of the said lock.

2. In a motion picture camera, a camera case having an unobstructed opening therein adapted to freely receive a film loop from a magazine, a door in said case for threading the film in said camera, a turnable lock on said door, a pin slidably mounted in said case adjacent an edge of said opening, a lever pivotably mounted at one end thereof on said camera case and having the free end engaging said pin, and a cam member turnable by said lock arranged to engage said lever and swing the same on its pivot for moving said pin.

3. In a motion picture camera having a camera case and a film magazine operatively attached thereto, there being film apertures in said magazine and an unobstructed opening in said case adapted to freely pass a film loop from said apertures, a magazine light trap comprising: sliding doors in said magazine arranged to open and close said apertures; a rotatable member mounted in said magazine operatively connected to said doors for opening and closing the same upon rotation of said member; a pinion at one end of said rotatable member; a rack slidably mounted at one side of said magazine adapted to engage said pinion; a pin slidably mounted in said case for moving said rack; a turnable lock for a door in said case; and means in said case for moving said pin by turning said lock.

4. In a motion picture camera having a camera case and a film magazine operatively attached thereto, there being film apertures in said magazine and an unobstructed opening in said case adapted to freely pass a film loop from said apertures, a magazine light trap comprising: sliding doors in said magazine arranged to open and close said apertures; a rotatable member mounted in said magazine operatively connected to said doors for opening and closing the same upon rotation of said member; a pinion at one end of said rotatable member; a rack slidably mounted at one side of said magazine adapted to engage said pinion; a pin slidably mounted in said case for moving said rack; a turnable lock for a door in said case; a lever pivotably mounted on said case at one end thereof and having the free end engaging said pin; and a cam on said turnable lock arranged to engage said lever and move the lever and the pin upon turning said lock when the door is closed.

5. In a motion picture camera, a camera case having a door with a turnable lock thereon, a film magazine having film apertures therein adapted to be mounted on said case, a light tight slidable closure member for each of said film apertures, means for sliding said closure members to open and close said film apertures by turning the lock on said door, said means including a rotatable cylindrical member mounted in said magazine, means for connecting said closure members to opposite peripheral sides of said cylindrical member, and means for rotating said cylindrical member by turning said lock on said door.

6. In a motion picture camera, a camera case having a door with a turnable lock thereon, a film magazine having a film feeding aperture and a film receiving aperture therein adapted to be mounted on said camera case, a light tight reciprocable closure member for each aperture, a cylindrical member rotatably mounted in said magazine between said closure members, means for operatively connecting one end of each of said closure members to opposite sides of said cylindrical member, and means for rotating said cylindrical member upon turning said lock in said door.

7. In a motion picture camera having a camera door with a lock thereon, a film magazine having compartments with film apertures in each of said compartments, light proof doors over each of said apertures, and means for moving said doors to open and close said apertures by the operation of the lock on said camera door, said last mentioned means including a rotatable cylindrical member in said magazine operably connected to said doors to open and close the same upon rotation of said member, a gear at one end of said cylindrical member, a rack arranged to engage said gear, a lever pivotally mounted in said camera case, a cam on said lock adapted to swing said lever upon its pivot point upon the turning of said lock to engage said rack and rotate said cylindrical member.

CHARLES MELVIN MILLER.